United States Patent
Elwell

[19]

[11] Patent Number: 5,811,963
[45] Date of Patent: Sep. 22, 1998

[54] LINE POWERED DC POWER SUPPLY

[75] Inventor: Brian E. Elwell, Culver City, Calif.

[73] Assignee: Novitas Incorporated, Culver City, Calif.

[21] Appl. No.: 817,256

[22] PCT Filed: Oct. 11, 1995

[86] PCT No.: PCT/US95/13609

§ 371 Date: Apr. 11, 1997

§ 102(e) Date: Apr. 11, 1997

[87] PCT Pub. No.: WO96/11488

PCT Pub. Date: Apr. 18, 1996

Related U.S. Application Data

[63] Continuation-in-part of Ser. No. 320,370, Oct. 11, 1994, abandoned.

[51] Int. Cl.[6] .............. G05B 24/02; G05F 1/10; H02J 1/00
[52] U.S. Cl. .............................. 323/318; 323/905
[58] Field of Search ..................... 323/245, 318, 323/905; 307/140

[56] References Cited

U.S. PATENT DOCUMENTS 4,270,058  5/1981  Schornack ........................ 307/140
4,300,090  11/1981 Weber ............................... 323/311
4,754,213  6/1988  Dubot et al. ...................... 323/326
4,878,010  10/1989 Weber ............................... 323/300

FOREIGN PATENT DOCUMENTS 2208019  2/1989  United Kingdom .

Primary Examiner—Stuart N. Hecker
Attorney, Agent, or Firm—Fulbright & Jaworski L.L.P.; John M. May

[57] ABSTRACT

A line powered supply for a wall mounted lighting load control system includes a power MOSFET in series with a load control relay and a second MOSFET in parallel with the load control relay. When the lighting load is off, the MOSFET in parallel with the load relay is selectively opened to charge a capacitor feeding a regulator used to provide control system power. When the lights are on, the capacitor provides control system power. The MOSFET in series with the load control relay is open circuited to provide AC to recharge the capacitor whenever the regulator drop out voltage is reached. The MOSFET conducts for all but a very small portion of the AC cycle so that substantially all the AC power is applied to the lighting load. A second AC to DC power converter uses similar MOSFET switching to use partial AC voltage cycles to charge a capacitor and provide low voltage DC power from higher AC voltages.

15 Claims, 6 Drawing Sheets

LINE POWERED DC POWER SUPPLY

This application is a continuation of PCT/US95/13609 filed Oct. 11, 1995, which is a CIP of U.S. application Ser. No. 08/320,370 filed Oct. 11, 1994, now abandoned.

BACKGROUND OF THE INVENTION

1. Field of the Invention

This invention relates generally to power supplies such as may be used to provide DC power from AC sources, and more particularly to the provision of a control voltage for a switchable series load control device.

2. Description of the Prior Art

Conventional residential and commercial AC wiring for lighting, heating and air conditioning provides a series connection in a wall mounted switch box for controlling the application of the AC mains power to the load. A series load control device, such as a simple hand operated mechanical switch, a relay control switch or a room occupancy detector, is positioned in the switch box to control the power applied from the AC mains to the load by making or breaking the series connection.

The hot side of the AC mains, called the AC hot line, is usually connected directly to the switch box together with the so-called switch leg from the load. One end of the load, such as a bank of room lights, is connected outside of the switch box directly to the neutral side of the AC mains. The other side of the load is called the switch leg and is made available in the switch box. Depending upon the application, an earth ground connection may also be made available at the switch box.

In operation, AC power is applied from the AC mains to the load when the series connection is made in the switch box between the switch leg and the AC hot line. This may be called the "lights-on" power condition although the load may be something other than lights, such as heating or cooling systems or the like. AC power is not applied to the load when the series connection in the switch box is not made. This is called the "lights-off" power condition.

Many simple series load control devices such as a mechanical room wall switch operate conveniently without the use of applied power other than the AC power applied to the load. As such series load control devices become more sophisticated, a separate source of power for powering the series load control device itself is often required in addition to the AC mains power applied to the load. For example, when a wall mounted room occupancy detector is used to control the lights in a room, the occupancy detector itself requires power from a control circuit voltage source for its control circuitry such as the occupancy detector transmitter, receiver and control relay. Control circuit voltage is typically DC voltage derived by rectification and regulation from the AC mains.

It is extremely convenient, when installing a series load control device in a wall mounted switch box, to derive the control circuit voltage directly from the existing wiring of the switch box rather than by leading additional wires to the switch box. During the lights-off power condition, control circuit voltage is most often derived by rectifying and regulating the AC voltage available between the AC hot and switch legs applied to the switch box. The development of this supply results in a small amount of current to flow through the AC load known as "leakage current". The amount of leakage current varies depending on factors including the AC voltage, load size and type, and control circuit requirements. Circuits are typically designed to provide sufficient "leakage current" for a worst case operating condition, and accepting waste at all other operating conditions. As load technology improves, specifically in the area of electronic lighting ballasts, AC loads are becoming less tolerant of excess leakage current.

During the lights-on condition, the AC hot and switch legs are series connected to each other, so another source of power from which the control circuit voltage may be derived must be employed.

Conventional designs provide control circuit voltage during the lights-on power condition from a circuit component placed in series with the load. One such series circuit component is a transformer winding as shown for example in U.S. Pat. No. 4,713,598 (Smith). Such conventional designs, however, waste substantial amounts of power and are often inconvenient. Transformers are heavy, bulky, expensive and unreliable. The wasted power is converted into unwanted excess heat in the switch box which harms other control circuit components and limits control circuit designs.

Conventional DC power supplies operating with AC power inputs typically utilize transformers and rectifier circuits to transform AC power into DC power and to reduce the associated voltage of the DC power produced. Such conventional power supplies often involve a constant AC power drain even when no DC power is being utilized. Because of the transformers that are typically incorporated in their design, these conventional power supplies are often difficult to turn on and off.

SUMMARY OF THE INVENTION

The present invention provides a powered supply in which a series component, such as a power MOSFET, is used to divert a portion of the AC power from an AC power source for storage in a DC power storage device, such as a capacitor. Various power diversion control strategies may be utilized in conjunction with this device. For example, under one strategy, when a predetermined level of energy has been stored, the power storage device is considered full and the series component stops diverting power to the power storage device. Control circuit voltage is derived from the stored, or pre-regulated, power. When the power in the storage device has been decayed to a predetermined level, the series component again applies power to the storage device.

In a first aspect, the present invention provides a line powered load control device for series connection in an AC circuit including a primary switching device, a load control circuit for selectively operating the primary switching device in an on condition to complete an AC load circuit and in an off condition to interrupt an AC load circuit, a power storage system for applying control circuit voltage to the load control circuit, a lights off power supply operable in the off condition for selectively charging the power storage system from the AC voltage, and a lights on power supply operable in the on condition for selectively charging the power storage system from the AC voltage.

In another aspect, the present invention provides a power supply including a wall mounted switch box, a series connection in the switch box carrying AC power to a load, a power storage system for providing DC power, and a charging circuit for selectively charging the power storage system from the AC power.

In still another aspect, the present invention provides a method of providing power to a control circuit in a wall mounted switch box including a series connection in a load control circuit operated by the control circuit by storing power in a capacitor to power the control circuit, interrupting the series connection when a voltage across the capacitor has decayed to a predetermined level, and rectifying the voltage across the interrupted series connection to recharge the capacitor.

In still another aspect, the present invention provides a method of providing DC power by utilizing an AC power source such as a wall socket and a power supply connected to that AC power supply for selectively charging a DC power storage system from the AC voltage. One possible application of this type of AC to DC power converter is as a replacement for transformer-based units presently plugged into AC wall sockets and used to produce low voltage DC power for use in electronic devices or battery rechargers. Another possible application is to produce an AC to DC power converter that plugs into a common AC wall socket, converts a small portion of the available AC power into DC power, and then makes available the remaining AC power in another AC socket, thereby producing DC power without a loss in the number of available AC sockets and power sources.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT(S)

Figure 1:
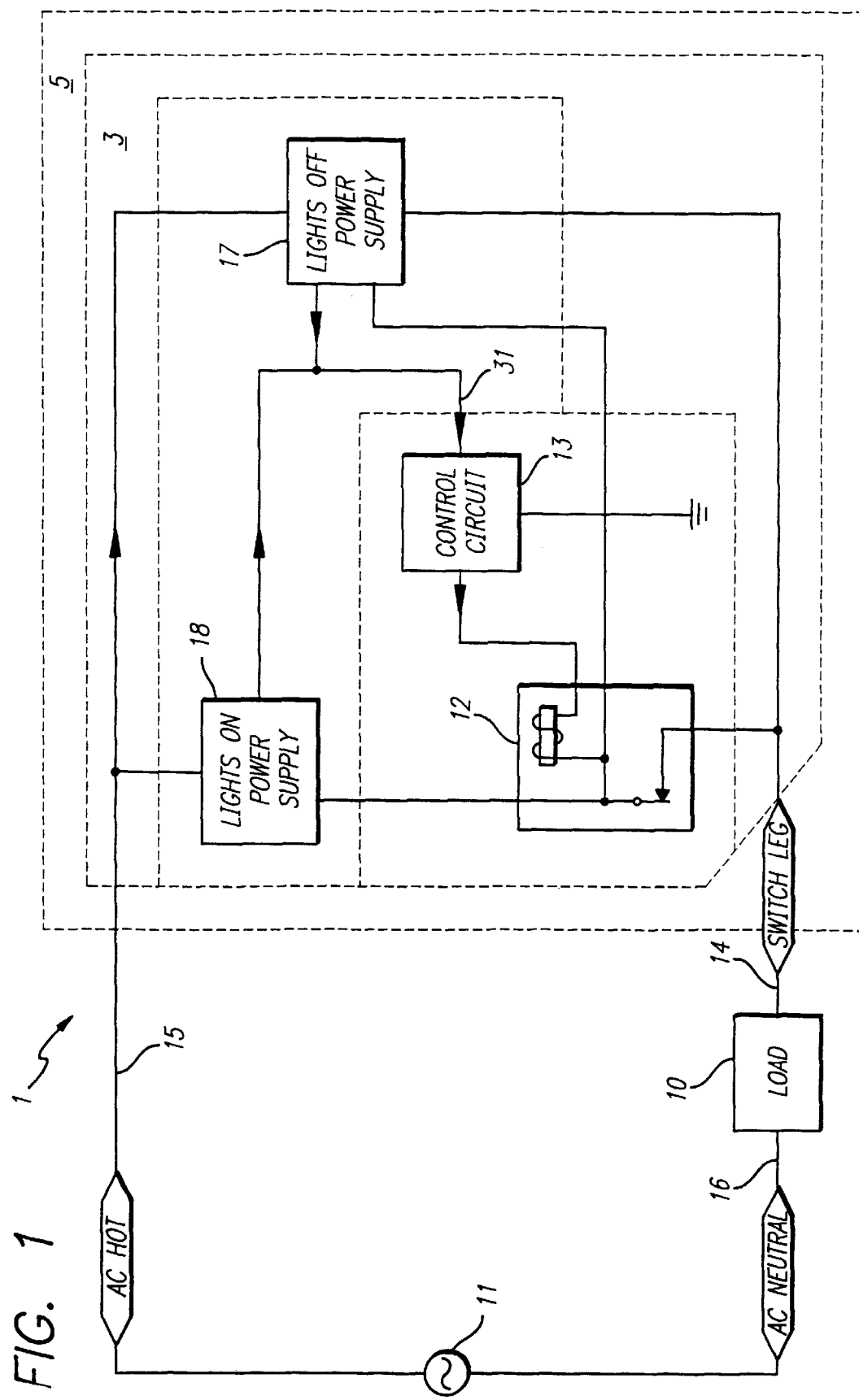
FIG. 1 is a block diagram schematic of an AC power control circuit including a line powered supply in accordance with the present invention.

FIG. 1 is a block diagram schematic of AC power control circuit 1 in which AC power from AC source 11 is applied to load 10 under control of series load control device 3. Load control device 3 includes an AC power control or switching device, such as control relay 12, operated by control circuit 13 to control the power applied to the load. Control circuit 13 may be a wall switch, room occupancy sensor or similar device. Series load control device 3, including control circuit 13, is mounted in switch box 5, such as a wall mounted switch box.

In accordance with conventional AC wiring techniques, AC hot lead 15 from AC source 11 and switch leg 14 are made available in switch box 5. Switch leg 14 from switch box 5 connects to one side of load 10, while the other side of load 10 is connected directly to AC neutral line 16. AC power source 11 is normally between 120 VAC or 347 VAC for industrial, commercial and or residential loads such as lighting loads.

Load 10 is activated in the so-called lights-on power condition when the contacts of control relay 12 are in the closed state making a series connection between switch leg 14 and AC hot lead 15. Lights on power supply 18, to be described below in greater detail, provides a series connection for AC hot lead 15 to one side of the contacts of control relay 12. The other side of the contacts of control relay 12 are connected directly to switch leg 14.

Control circuit 13 activates and deactivates control relay 12 to operate the relay contacts to make a series connection and thereby apply voltage from AC source 11 to load 10 or to open the series connection and disconnect voltage from AC source 11 from load 10. Control circuit 13 may be operated manually, remotely or automatically in a complex device such as a room occupancy detector. For such operation, control circuit 13 requires control circuit voltage, shown as control circuit voltage 31, to energize the components within control circuit 13. That is, in addition to providing power for the activation of control relay 12, control circuit 31 also provides power for the various electronic circuit components, sensors, detectors, transmitters, receivers and other devices associated with series load control device 3 and located within switch box 5.

Figure 2:
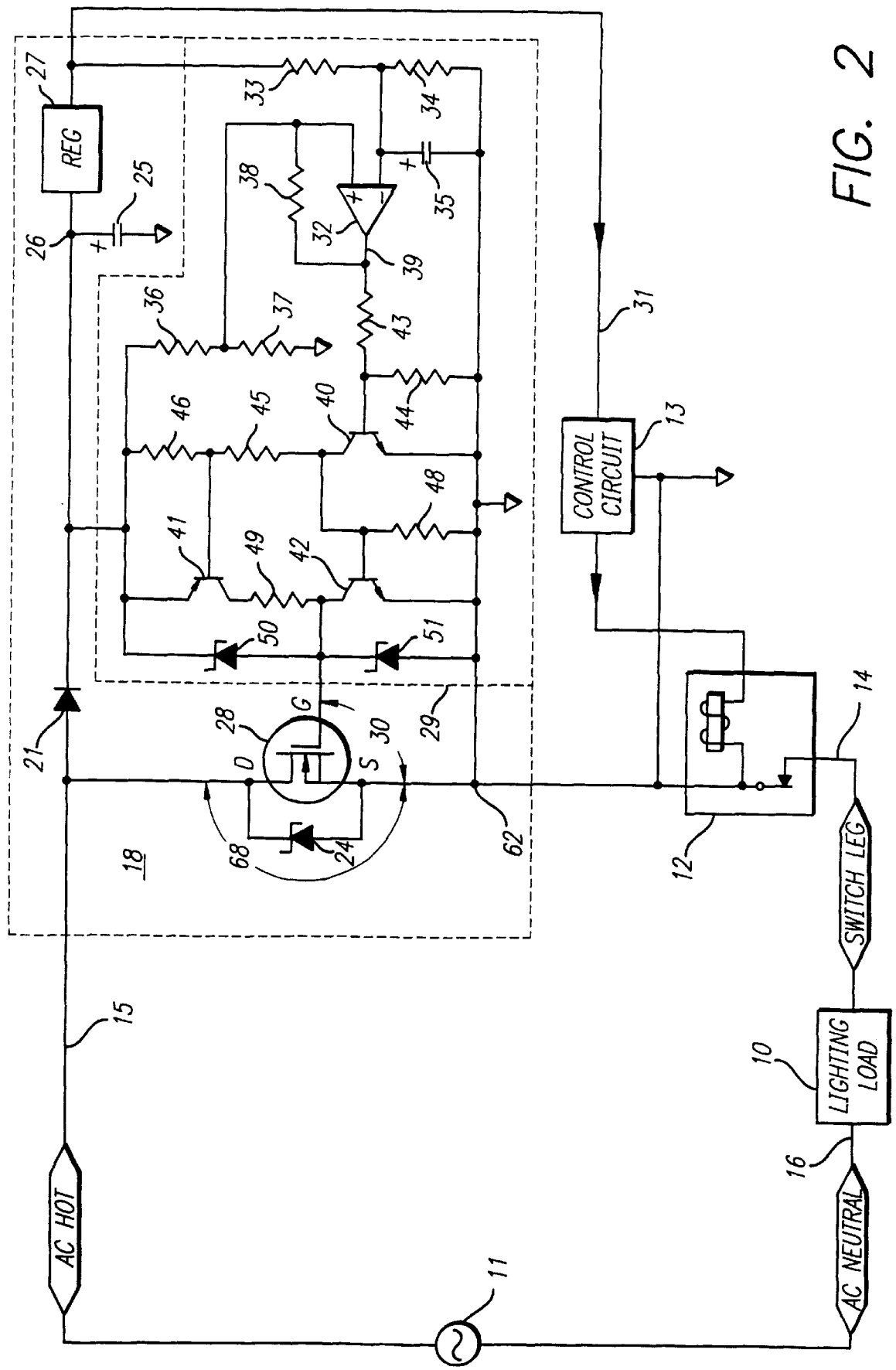
FIG. 2 is a schematic representation of the AC power control circuit of FIG. 1 showing a first embodiment of lights on power supply 18 in greater detail.

Control circuit voltage 31 is applied to control circuit 13 from lights on power supply 18 during the lights-on condition and from lights off power supply 17 during the lights-off condition. Referring now to FIG. 2, lights on power supply 18 is shown in greater detail. Lights on power supply 18 operates when the contacts of control relay 12 are closed to connect switch leg 14 and AC hot lead 15 to apply power from AC source 11 to load 10. Since the only voltage drop available within switch box 5 when the relay contacts are closed is the very small drop across the closed relay contacts, conventional voltage regulation techniques cannot be used directly.

In accordance with the present invention, electronic switching component 28 is placed in series with control relay 12 to provide a voltage drop within switch box 5 during the lights-on power condition in order to provide a source of power from which control circuit voltage 31 may be derived. Switching component 28, when conducting, provides a connection between AC hot lead 15 and control relay 12 to apply power to load 10 through switch leg 14 in the lights-on power condition. In order to minimize the unwanted drop in the voltage applied to load 10, it is important to minimize the voltage drop across switching component 28 when conducting and to minimize the time during which switching component 28 is not conducting. A power MOSFET, such as Motorola Part No. MTA30N06E, conveniently provides the high switching speed and low conduction impedance required for use as switching component 28.

In accordance with the present invention, the drain lead of switching component or MOSFET 28 is connected to AC hot lead 15 while the source lead is connected to circuit ground 62 of lights on power supply 18 at one side of the contacts of control relay 12. Circuit ground 62 is not the same as the earth ground used for AC source 11.

During operation of lights on power supply 18, MOSFET 28 is controlled by MOSFET control circuit 29 to disconnect AC hot lead 15 from switch leg 14 for only as long as necessary to divert sufficient power from AC source 11 to a power storage device, such as electrolytic capacitor 25. In particular, when MOSFET 28 is biased in the off or non-conducting state in the lights-on power condition, substantially the entire supply voltage of AC source 11 is available between AC hot lead 15 and circuit ground 62 which is at the closed contacts of relay 12 and therefore tied directly to switch leg 14.

This supply voltage between AC hot lead 15 and circuit ground 62 is rectified on the positive half cycle, that is half wave rectified, by rectifier diode 21 which allows current to flow into and quickly charge electrolytic capacitor 25. Negative half cycles of power from AC source 11 are applied directly to load 10 by bypass or avalanche Zener diode 24 connected as shown from source to drain leads of MOSFET 28. Avalanche Zener diode 24 is provided within the MOSFET case for certain power MOSFET devices, such as the above described Motorola MTA30N06E.

The resultant voltage across electrolytic capacitor 25, pre-regulated voltage 26, is regulated by conventional voltage regulator 27 to provide control circuit voltage 31 applied to control circuit 13. As is normal with such conventional voltage regulators, pre-regulated voltage 26 must exceed the voltage of control circuit voltage 31 by a sufficient excess voltage to permit voltage regulator 27 to provide a constant and stable voltage output as control circuit voltage 31. The excess of pre-regulated voltage 26 over the voltage of control circuit voltage 31 is typically about 2 volts DC but varies with different components used for voltage regulator 27. Using 2 volts as a typical value, as long as electrolytic capacitor 25 provides a pre-regulated voltage 26 at least 2 volts greater than control circuit voltage 31, the stored power within electrolytic capacitor 25 is sufficient to produce control circuit voltage 31.

Electrolytic capacitor 25 and voltage regulator 27 may be located in lights on power supply 18, in lights off power supply 17, or in control circuit 13. FIG. 2 illustrates a design in which electrolytic capacitor 25 and voltage regulator 27 are located in lights on power supply 18.

When the charge across electrolytic capacitor 25 drops to within 2 volts of control circuit voltage 31, the charge across electrolytic capacitor 25 must be replenished. During the lights-off power condition, the charge across electrolytic capacitor 25 is constantly maintained by a charging circuit in lights off power supply 17 described in greater detail with respect to FIG. 3 below. During the lights-on power condition, the charge across electrolytic capacitor 25 is maintained by operation of MOSFET 28 under the control of MOSFET control circuit 29 as will now be described.

MOSFET control circuit 29 compares pre-regulated voltage 26 and control circuit voltage 31 to determine when the charge across electrolytic capacitor 25 has dropped down to just above the minimum level of excess voltage, known as the drop out voltage, necessary for voltage regulator 27 to maintain a constant and stable control circuit voltage 31. When this condition is true, MOSFET control circuit 29 operates to cause MOSFET 28 to disconnect AC hot lead 15 from circuit ground 62 so that the resultant open circuit voltage between AC hot lead 15 and circuit ground 62 is rectified by rectifier diode 21 and applied to electrolytic capacitor 25 during positive half cycles as noted above.

AC source 11 typically provides 117 volts AC or more at high current while control circuit voltage 31 is on the order of 5 volts DC. Control circuit 13 typically requires only very low current. The application of a part of a positive half cycle of A.C. power from AC source 11 by rectifier diode 21 is therefore able to very quickly charge electrolytic capacitor 25 sufficiently to provide control circuit voltage 31. In many applications it is expected that electrolytic capacitor 25 will be fully charged by the application of only a small fraction of a single positive half cycle of A.C. power.

It is therefore important that the switching component, such as MOSFET 28, used to disconnect AC hot lead 15 from the contacts of relay 12 in order to charge electrolytic capacitor 25, be able to operate very quickly so that minimum loss of power applied to load 10 is experienced during the charging cycle. A power MOSFET device as shown in this preferred embodiment is perfectly suited to this task. MOSFET 28 is effectively off, disconnecting AC hot lead 15 from circuit ground 62, when gate-to-source voltage 30 (Vgs) is at or below zero volts. MOSFET 28 is effectively on when gate-to-source voltage 30 is positive. MOSFET 28 is fully conducting when gate-to-source voltage 30 is at least about 5 volts DC while MOSFET 28 has a maximum acceptable gate-to-source voltage 30 of about 20 volts DC.

Although power MOSFETs such as MOSFET 28 are often used in linear operation as power amplifiers, such as audio amplifiers, MOSFET 28 is used in the present invention as a fast operating switch. MOSFET 28 is controlled by MOSFET control circuit 29 in response to the difference in voltage between pre-regulated voltage 26 and control circuit voltage 31 as described below.

In particular, operational amplifier 32 of MOSFET control circuit 29 is used as a comparator to compare pre-regulated voltage 26 to control circuit voltage 31 to determine if sufficient excess voltage for proper regulation is available. The junction between voltage divider resistors 33 and 34 between control circuit voltage 31 and circuit ground 62 is stored in electrolytic capacitor 35 which is tied to the inverting input of operational amplifier 32.

A predetermined portion of the normal value of control circuit voltage 31, which is typically 5 or 12 volts DC, is therefore one input to the comparator formed by operational amplifier 32. The junction between voltage divider resistors 36 and 37 between pre-regulated voltage 26 and circuit ground 62 is applied to the non-inverting input of operational amplifier 32. A different predetermined portion of the instantaneous value of pre-regulated voltage 26 is therefore applied as the other input of the comparator formed by operational amplifier 32. Note that a capacitor is not used with the non-inverting input to operational amplifier 32 so that changes in pre-regulated voltage 26 are applied as quickly as possible to operate MOSFET 28.

The difference in these predetermined portions, that is, the difference of the ratios of resistors 33 to 34 and 36 to 37, is used to account for the excess voltage needed in pre-regulated voltage 26 above control circuit voltage 31 for proper operation. Voltage regulators require that the pre-regulated voltage exceeds the regulated voltage by a certain minimum amount for proper regulation. When the pre-regulated voltage is reduced to the minimum voltage at which dependable regulation occurs, it is said to have reached its drop out voltage because any further reduction in the pre-regulated voltage would cause the regulator to drop out, that is, to stop functioning properly.

The ratios of the voltage dividers applied to the input of operational amplifier 32 are therefore selected so that operational amplifier 32 changes state when pre-regulated voltage 26 drops down to just above the drop out voltage. The voltage derived from control circuit voltage 31, applied through the voltage divider, serves as a reference input to operational amplifier 32. In addition, feed back resistor 38 is used between the non-inverting input of operational amplifier 32 and its output to provide sufficient hysteresis to prevent ringing or oscillating of operational amplifier 32.

It is important to note that when power is first applied to power supply 18, the output of operational amplifier 32 is naturally low. In this way, power supply 18 is self starting in that when power is first applied to power supply 18, MOSFET 28 is open, causing electrolytic capacitor 25 to charge until pre-regulated voltage 26 is high enough to provide stable power to voltage regulator 27 to produce control circuit voltage 31. If MOSFET 28 were caused to conduct when power was first applied, some other means of providing an initial charge on electrolytic capacitor 25 would be required.

When the voltage applied to the non-inverting input of operational amplifier 32 is higher than the reference voltage derived from control circuit voltage 31 that is applied to the inverting input of operational amplifier 32, pre-regulated voltage 26 is greater than the drop out voltage of voltage regulator 27, and MOSFET control signal 39 at the output of operational amplifier 32 is logically high which causes gate-to-source voltage 30 of MOSFET 28 to exceed 5 volts and keep MOSFET 28 in a conducting state. Alternatively, when the reference input applied to the inverting input of operational amplifier 32 is higher than the voltage applied to the non-inverting input, MOSFET control signal 39 is logically low and MOSFET 28 is caused to disconnect AC hot lead 15 from circuit ground 62 and therefore from switch leg 14 which appears across the closed contacts of control relay 12.

In other words, operational amplifier 32 detects when pre-regulated voltage 26 drops to the drop out voltage of voltage regulator 27. MOSFET control signal 39 goes low causing MOSFET 28 to open circuit so that lights on power supply 18 goes into a charging mode in which line voltage is applied to rectifier diode 21 to charge electrolytic capacitor 25.

In particular, when MOSFET control signal 39 goes logically low, NPN transistor 40 and therefore PNP transistor 41 do not conduct while NPN transistor 42 is turned on via resistors 45 and 46. With NPN transistor 42 on, gate-to-source voltage 30 is clamped to ground turning off MOSFET 28 and applying the voltage between AC hot lead 15 and circuit ground 62 to rectifier diode 21 to charge electrolytic capacitor 25.

Similarly, operational amplifier 32 is used to determine when pre-regulated voltage 26 exceeds the drop out voltage of voltage regulator 27. MOSFET control signal 39 goes high causing MOSFET 28 to conduct so that lights on power supply 18 goes into a discharging mode in which control circuit voltage 31 is provided by the power stored in electrolytic capacitor 25.

In particular, when MOSFET control signal 39 is high, NPN transistor 40 is turned on via resistor 43. When NPN transistor 40 is on, PNP transistor 41 is turned on via resistor 45 while NPN transistor 42 is turned off. When PNP transistor 41 is turned on, pre-regulated voltage 26 is conducted through resistor 49 to the gate lead of MOSFET 28 so that gate-to-source voltage 30 is roughly equal to pre-regulated voltage 26. This is sufficient to cause MOSFET 28 to conduct and apply AC hot lead 15 to switch leg 14 through the closed contacts of control relay 12.

In addition, lights on power supply 18 includes a protection circuit in the form of Zener diodes 50 and 51 which shunt excess voltage and current around MOSFET 28 when high voltage transients occur such as when power initialization occurs. Zener diodes 50 and 51 supplement the protection provided by avalanche Zener diode 24 provided in the same case with MOSFET 28 for the same purpose. Avalanche Zener diode 24 may not be able to handle the extreme transients, on the order of a few kilovolts, that can occur in this application. If the contacts of control relay 12 are closed when the transient occurs, Zener diode 50 breaks down gating MOSFET 28 on. Zener diode 51 ensures that gate-to-source voltage 30 never exceeds the maximum rating of MOSFET 28.

Figure 3:
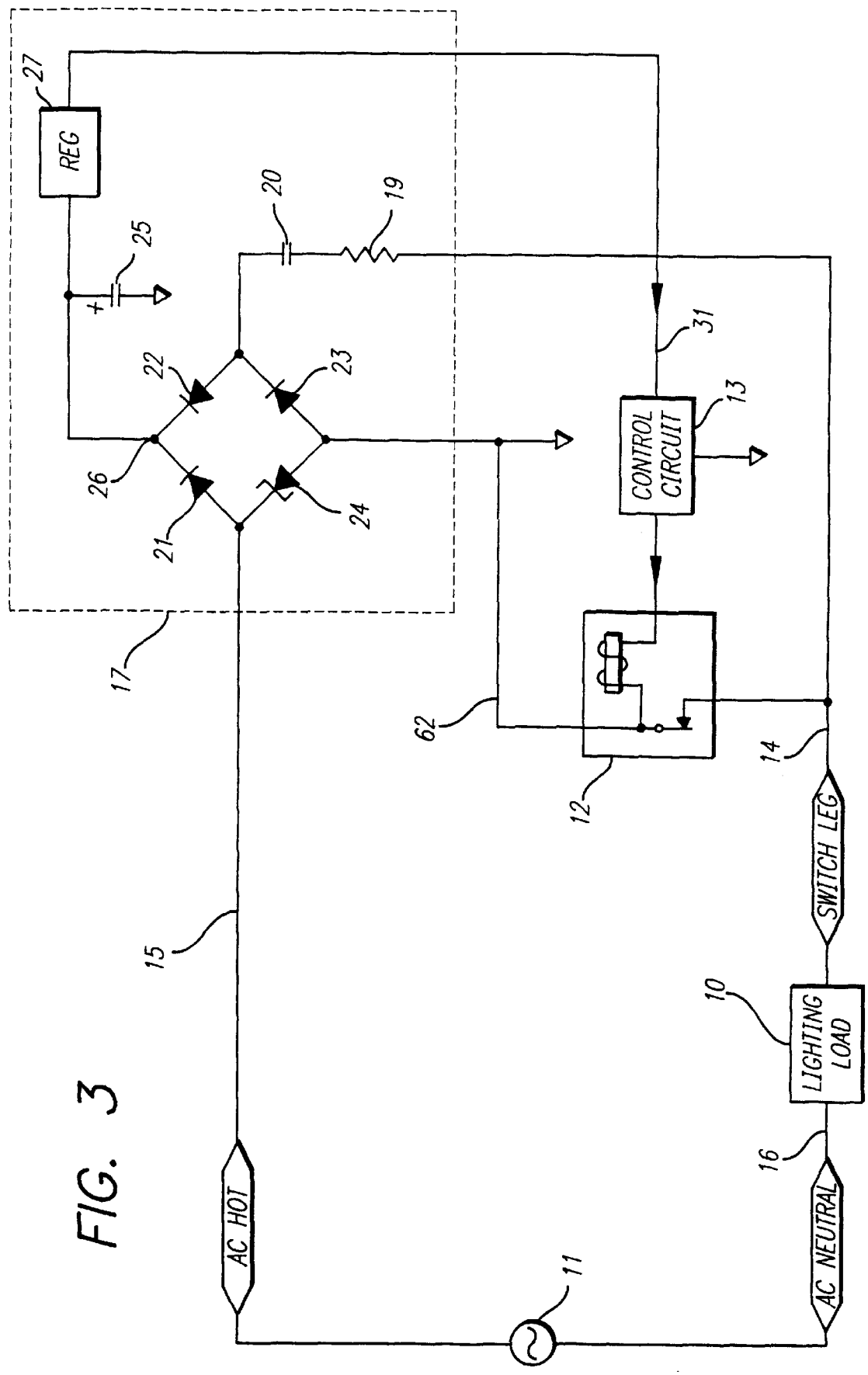
FIG. 3 is a schematic representation of the AC power control circuit of FIG. 1 showing a first embodiment of lights off power supply 17 in greater detail.

Referring now to FIG. 3, the lights off portion of series load control device 3 is described in greater detail in which lights off power supply 17 provides DC voltage as control circuit voltage 31 from the AC voltage available between switch leg 14 and AC hot lead 15 when the contacts of control relay 12 are open. Load 10 is typically a low impedance load, such as a bank of lights, so that the impedance of load 10 is relatively low compared to the impedance of lights off power supply 17. Therefore, although load 10 is in series with switch leg 14, substantially all of the AC power from AC source 11 is available between switch leg 14 and AC hot lead 15 in the lights-off power condition. In this condition, the contacts of control relay 12 are open so that the open circuit voltage between switch leg 14 and AC hot lead 15 is applied to lights off power supply 17.

In particular, a diode bridge rectifier is formed using avalanche Zener diode 24 packaged with MOSFET 28, rectifier diode 21 used in lights on power supply 18 and described above with respect to FIG. 2, and additional rectifier diodes 22 and 23. The bridge node between diodes 21 and 24 is applied to AC hot lead 15. The bridge node between diodes 22 and 23 is applied to switch leg 14 via mylar capacitor 20 and flameproof resistor 19. Resistor 19 and capacitor 20 serve to limit the 60 Hz AC voltage applied to the diode bridge rectifier and serve as surge protectors.

Resistor 19 is connected between switch leg 14 and mylar capacitor 20. Resistor 19 is a flame proof type of resistor and provides protection for the circuit. In the event of an overload condition, flameproof resistor 19 would open circuit interrupting the flow of current into the diode bridge rectifier.

Capacitor 20 is a metallized mylar capacitor which allows the AC current to be limited without the dissipation of heat as would be the case with a resistor. Capacitor 20 is connected between resistor 19 and the diode rectifier bridge node between rectifier diodes 22 and 23.

To complete the bridge circuit, the bridge node at the cathodes of diodes 21 and 22 provides pre-regulated voltage 26 to the cathode of electrolytic capacitor 25. The bridge node at the anodes of diodes 23 and 24 is connected to circuit ground 62. Rectified and filtered pre-regulated voltage 26 is thereby applied to electrolytic capacitor 25, and voltage regulator 27, during the lights off power condition. Control circuit voltage 31 at the output of voltage regulator 27 is then applied to control circuit 13.

Electrolytic capacitor 25 and voltage regulator 27 may be located in lights on power supply 18, lights off power supply 17, or in control circuit 13. FIG. 3 illustrates a design in which electrolytic capacitor 25 and voltage regulator 27 are located in lights off power supply 17.

Figure 4:
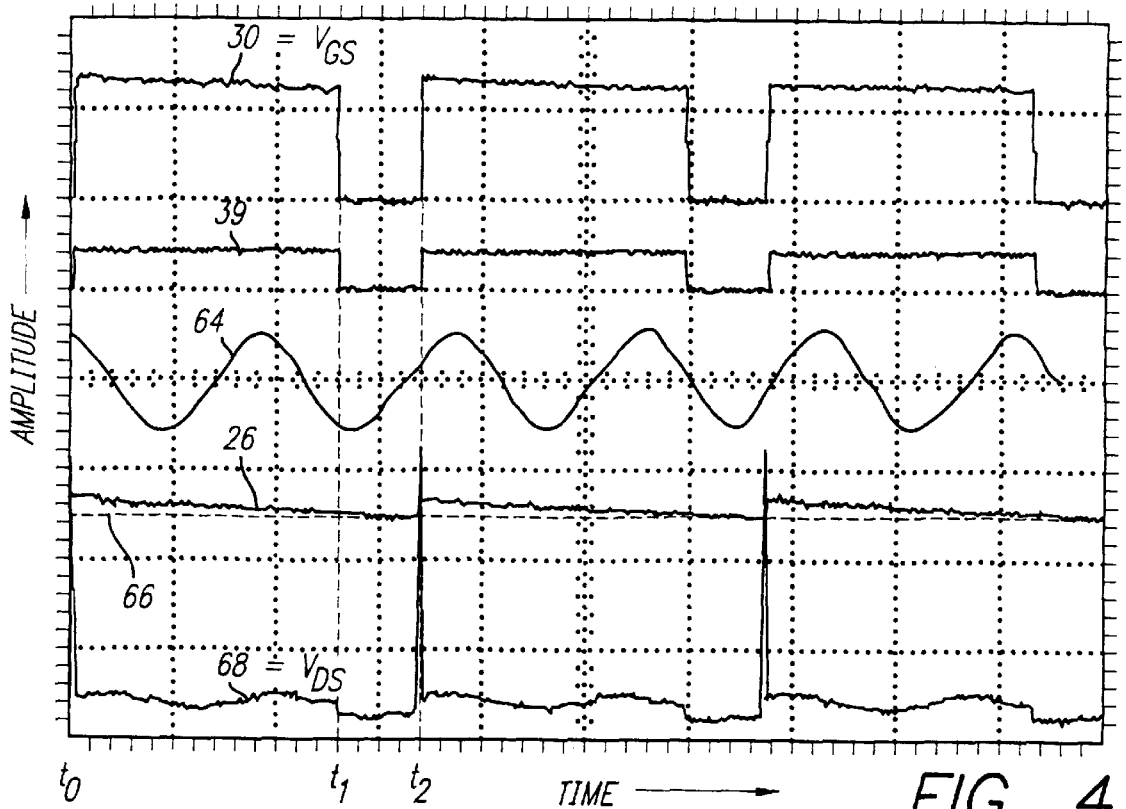
FIG. 4 is a series of graphs showing the operation of the first embodiment of the present invention.

Referring now to FIG. 4, sinusoidal voltage 64 represents the 60 Hz AC supply voltage provided by AC source 11 during the operation of lights on power supply 18. Gate-to-source voltage 30 controls the conduction of MOSFET 28.

From just after time t0 until time t1, lights on power supply 18 operates in the discharging mode. In particular, gate-to-source voltage 30 is substantially positive, that is, high enough to cause MOSFET 28 to conduct. Pre-regulated voltage 26 exceeds drop out voltage 66 of voltage regulator 27 so that control circuit voltage 31 is provided by the power stored in electrolytic capacitor 25 during a previous cycle. Since pre-regulated voltage 26 exceeds drop out voltage 66, MOSFET control signal 39 is positive which keeps MOSFET 28 conducting. During this time interval, applied AC voltage 68 varies slightly in response to AC source 11 in accordance with the conduction impedance of MOSFET 28. Applied AC voltage 68 is the drain-to-source voltage of MOSFET 28, that is, the voltage between AC hot lead 15 and circuit ground 62.

At time t1, pre-regulated voltage 26 has decayed to drop out voltage 66. It is important to note that drop out voltage 66 must be slightly greater than the minimum drop out voltage of voltage regulator 27 because pre-regulated voltage 26 may continue to decay for a portion of a cycle. In particular, as will be shown, if pre-regulated voltage 26 decays below drop out voltage 66 during a negative going half cycle of sinusoidal voltage 64, the charging mode of operation of lights on power supply 18 will not begin until the next positive going half cycle is entered. Drop out voltage 66 therefore must exceed the minimum drop out voltage by a sufficient threshold level so that the further decay of the voltage in electrolytic capacitor 25 during a negative going half cycle can be accommodated.

When pre-regulated voltage 26 decays below drop out voltage 66 at time t1, this condition is recognized by operational amplifier 32 and MOSFET control signal 39 goes low. This causes gate-to-source voltage 30 to go low so that MOSFET 28 will not conduct. During the negative half cycle of sinusoidal voltage 64, avalanche Zener diode 24 is conducting so that lights on power supply 18 remains in the discharging mode.

At time t2, however, sinusoidal voltage 64 crosses zero and enters the positive going half cycle of AC power. Because it is a positive going half cycle, avalanche Zener diode 24 cannot conduct. Because pre-regulated voltage 26 has decayed below drop out voltage 66, MOSFET control signal 39 and therefore gate-to-source voltage 30 are low so that MOSFET 28 cannot conduct. This is the beginning of the charging mode of operation. Applied AC voltage 68 provides AC power to lights on power supply 18 for regulation by rectifier diode 21 and storage in electrolytic capacitor 25.

As soon as sufficient power is stored in electrolytic capacitor 25, pre-regulated voltage 26 exceeds drop out voltage 66. This condition is recognized by operational amplifier 32 so that MOSFET control signal 39, and therefore gate-to-source voltage 30, go high. As soon as MOSFET 28 begins to conduct, applied AC voltage 68 returns to the low sinusoid voltage reflecting the internal impedance of MOSFET 28 during conduction.

In a typical implementation, AC source 11 may provide 110 Volts AC while drop out voltage 66 for a particular voltage regulator 27 may be 7 volts for a 5 volt control circuit voltage 31. Pre-regulated voltage 26 would then cycle between about 10 volts and 7 volts and the maximum applied AC voltage 68 is about 35 volts. The switching speed of MOSFET 28 must be on the order of about one millisecond, preferably as fast as about 2 microseconds, to minimize power interruption to the load, such as flicker.

It is important to note that power supply 18 is load driven in that MOSFET 28 is caused to operate more often under high load conditions for voltage regulator 27 than it operates under lower load conditions. In a particular implementation of control circuit 13, 5 ma of power is required for control circuit 13. Under certain conditions, an LED in control circuit 13 is illuminated so that the current draw is increased to 7 ma. In a system as described, MOSFET 28 would be caused to operate once every 3 or 4 cycles of AC power when the LED is not illuminated, but MOSFET 28 would be caused to operate once every 2 or 3 cycles when the LED is on.

In accordance with the present invention, MOSFET 28 is selectively operated in response to the load on voltage regulator 27 which results in a substantial saving of otherwise wasted power in a conventional system. For example, a conventional line powered supply produces wasted power at load conditions for which it is designed, the amount of power wasted is a function of the range of loads for which the circuit was designed. With the present invention, the amount of power wasted is minimal and not dependent on the range of loads for which the circuit is designed, but rather is directly dependent on the power actually used by the circuit.

Figure 5A:
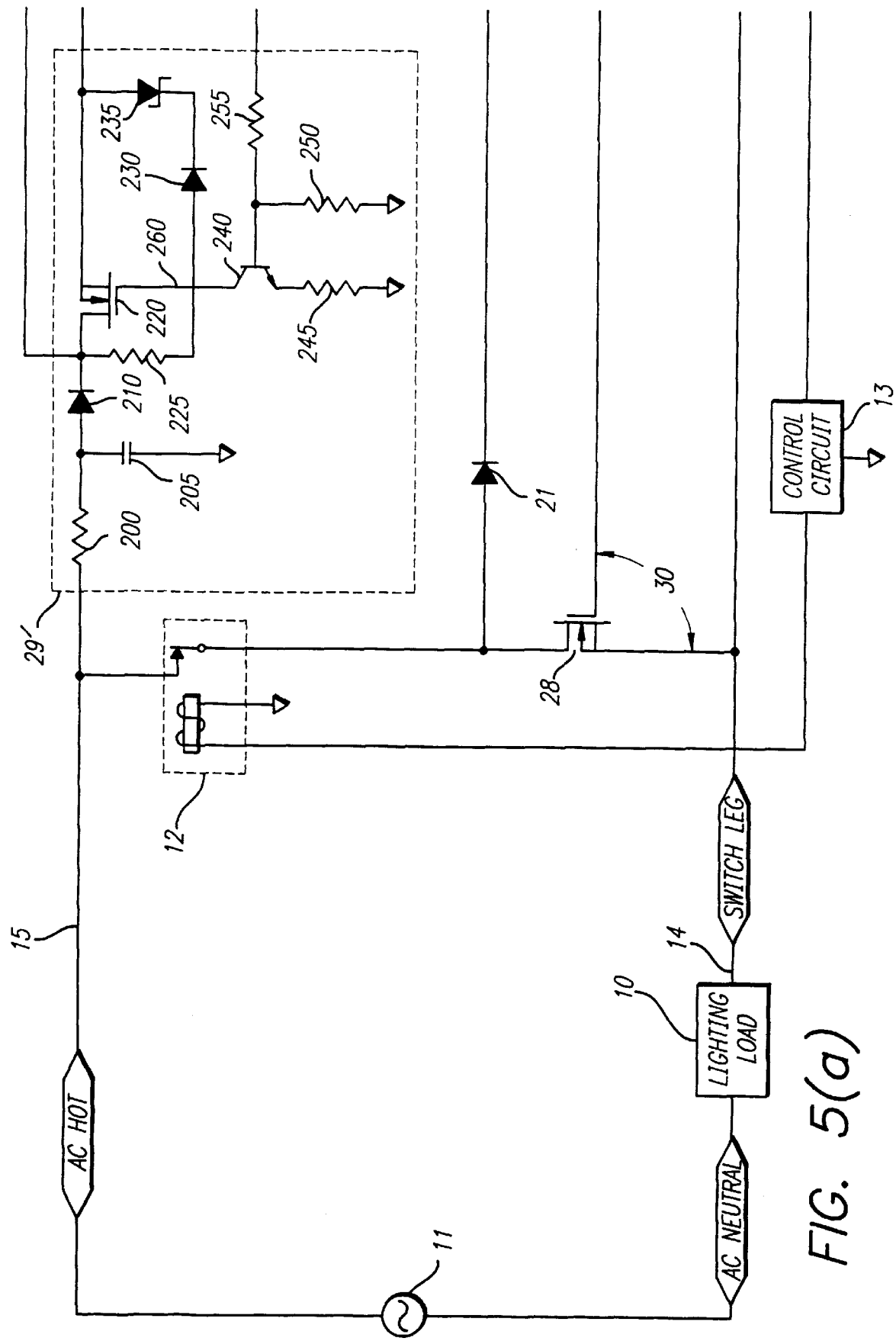
FIGS. 5a and 5b are a schematic representation of a second embodiment of the AC power control circuit of FIG. 1.
Figure 5B:
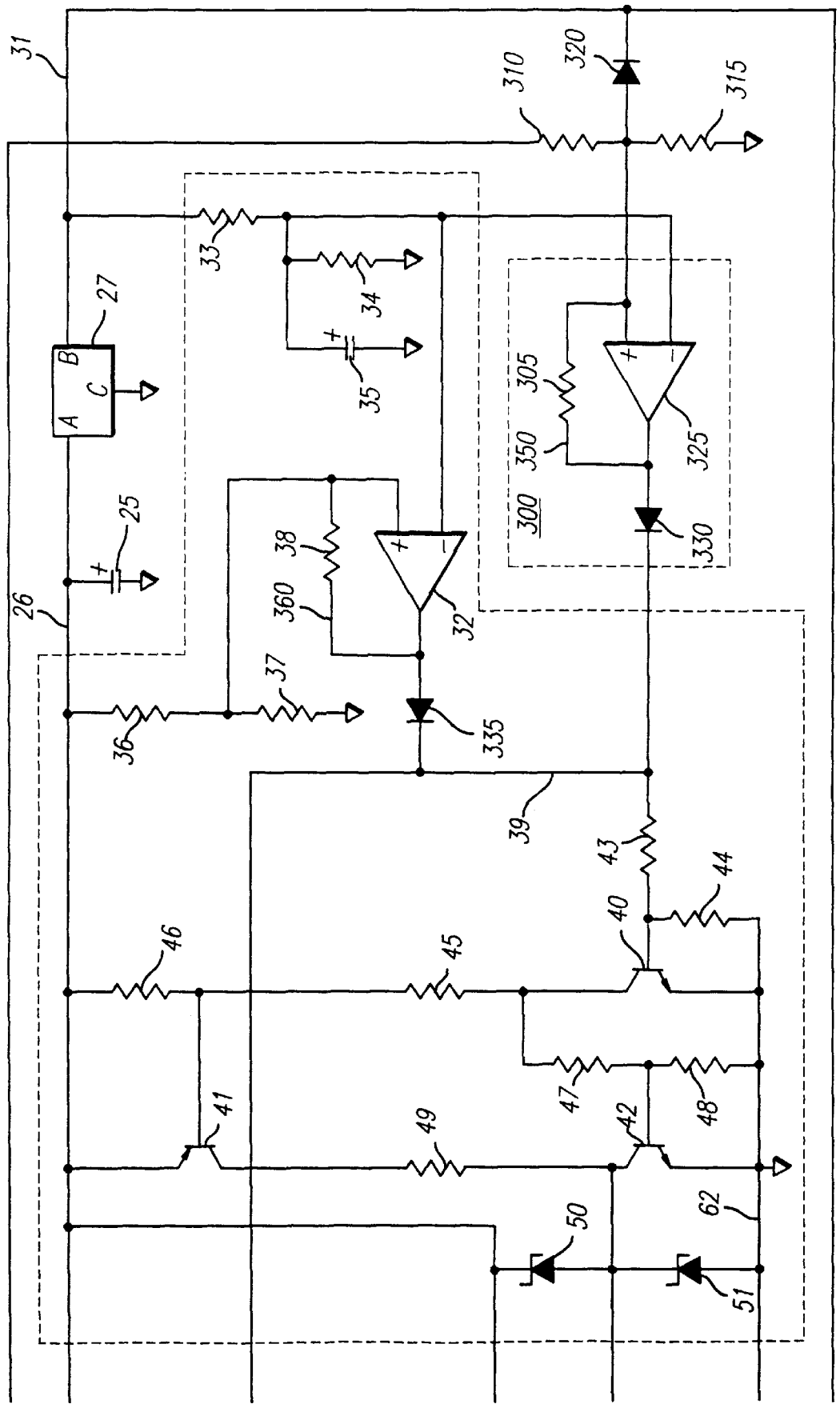

Referring now to FIG. 5, a second embodiment of series load control device 3 is described in greater detail. Components of this embodiment operate in the same manner as similarly numbered components of the first embodiment as described above, except that Zener diode 24 is internally connected from source to drain leads of MOSFET 28 and not separately shown, the relay contacts of control relay 12 are now connected between AC hot lead 15 and the drain lead of switching component or MOSFET 28, the source lead of switching component or MOSFET 28 is connected to circuit ground 62 of lights on power supply 18 which is also connected to switchleg lead 14, an additional resistor 47 is added to the design such that when MOSFET control signal 39 goes logically low, NPN transistor 40 and therefore PNP transistor 41 do not conduct while NPN transistor 42 is turned on via resistors 45, 46 and 47 and with NPN transistor 42 on, gate-to-source voltage 30 is clamped to ground turning off MOSFET 28 and applying the voltage between AC hot lead 15 and circuit ground 62 to rectifier diode 21 to charge electrolytic capacitor 25 during positive half cycles. In addition to these differences, the second embodiment includes a revised design for lights off power supply 17 and the addition of voltage limiting comparator circuit 300 as described more fully below.

In the second embodiment of lights on power supply 18 illustrated in FIG. 5, during the lights-off power condition, the charge across electrolytic capacitor 25 is maintained by operation of MOSFET 220 under the control of MOSFET control circuit 29. During the lights-on power condition, the charge across electrolytic capacitor 25 is maintained by operation of MOSFET 28 under the control of MOSFET control circuit 29' as described above.

In accordance with the present invention and as shown in FIG. 5, electronic switching component 220 is placed in series with diode 210 and the power storage device, electrolytic capacitor 25. In particular, when MOSFET 220 is biased in the on or conduction state in the lights-off power condition, positive half cycles will replenish the charge on capacitor 25 via resistor 200 and diode 210.

Supply voltage present between AC hot lead 15 and circuit ground 62 is current limited by resistor 200 and half wave rectified by diode 210 prior to being applied to the drain of MOSFET 220.

When MOSFET 220 is biased on, the half wave rectified voltage is connected to capacitor 25, thereby replenishing the charge stored in capacitor 25.

During operation of lights off power supply 17, MOSFET 220 is controlled by MOSFET control circuit 29' to connect AC hot lead 15 to preregulated voltage 26 for only as long as necessary to divert sufficient power from AC source 11 to a power storage device, such as electrolytic capacitor 25. In particular, when MOSFET 220 is biased in the off or non-conduction state, the extremely high impedance of switching device 220 causes virtually no current to flow between hot lead 15 and switchleg lead 14, and therefore through the load 10. When MOSFET 220 is biased in the on or conduction state in the lights off power condition, substantially the entire supply voltage of AC source 11 is available between AC hot lead 15 and preregulator voltage 26, which is relatively close to circuit ground voltage (within approximately 10 volts), which is internally connected to switchleg lead 14.

When MOSFET 220 is biased in the on or conduction state in the lights off power condition, the supply voltage between AC hot lead 15 and circuit ground 62 is half wave rectified by diode 210 allowing positive half cycles to replenish the charge stored in capacitor 25. Negative half cycles are blocked by diode 210.

MOSFET control signal 39 functions as the output of an and gate which is comprised of comparators 32 and 325. The comparator outputs are combined together via diodes 330 and 335 to yield MOSFET control signal 39. If either comparator output is high, the power supply is placed into the discharge mode, and when both comparator outputs are low the power supply is placed into the charge mode.

Comparator 32 is the power supply control comparator, and functions as described for the lights on power supply circuit. Comparator 325 is the voltage limiting comparator circuit which ensures that replenishment of capacitor 25 does not start until the voltage between the AC hot lead 15 and circuit ground 62 are below the threshold voltage of comparator 325. This mostly ensures that the replenishment of storage device 25 does not begin until the beginning of the next positive half cycle, which minimizes transients and electro-magnetic interference (EMI). Resistors 310 and 315 act as a voltage splitter to determine the voltage provided to comparator 325. Diode 320 insures that the output of comparator 325 becomes high and the power supply is placed into the discharge mode when the AC voltage from AC source 11 is above a predetermined voltage. When the voltage from AC source 11 drops below the predetermined voltage, the output of comparator 325 will be low and, if the output of comparator 32 is also low, the power supply is placed into the charge mode. The voltage limiting comparator circuit 300 does not have any effect on circuit operation during the lights on mode since the voltage drop between AC hot 15 and circuit ground 62 does not exceed the comparator trigger voltage.

The MOSFET control circuit 29' functions as in the lights on power supply mode, with the addition of MOSFET control signal 39 also controlling the gate of MOSFET 220 via NPN transistor 240. In particular, when MOSFET control signal 39 is high (discharge mode), NPN transistor 240 is turned on grounding the gate of MOSFET 220 effectively turning off MOSFET 220. When MOSFET control signal 39 is low (charge mode), NPN transistor 240 is turned off and MOSFET 220 is turned on via resistor 225. Diodes 230 and 235 ensure that the gate to source voltage of MOSFET 220 does not exceed 20 volts, which would damage the part. Diode 230 ensures that the preregulator voltage 26 is not shunted to ground via NPN transistor 240 during discharge mode.

It is again important to note that when power is first applied to power supply 17, the outputs of both comparators will be low, and therefore MOSFET control signal 39 will also be low and the power supply will be in charge mode. In this way the power supply 17 is self starting in that when power is first applied to power supply 17 MOSFET 220 is turned on via resistor 225, causing electrolytic capacitor 25 to charge until preregulator voltage 26 is high enough to provide stable power to voltage regulator 27 to produce control circuit voltage 31. If MOSFET 220 were caused to not conduct when power was first applied in the lights off mode, some other means of providing an initial charge on electrolytic capacitor 25 would be required.

Figure 6:
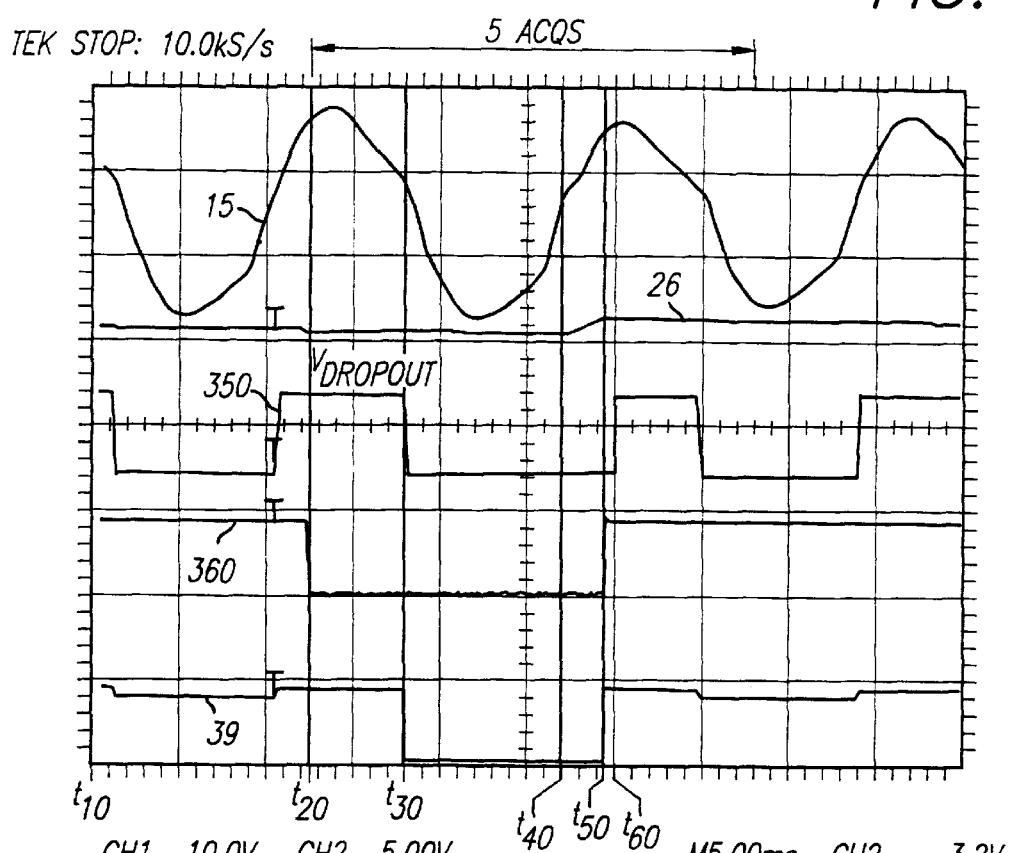
FIG. 6 is a series of graphs showing the operation of the second embodiment.

Referring now to FIG. 6, sinusoidal voltage 15 represents the 60 Hz AC supply voltage provided by AC source 11 during the operation of the lights off power supply 17. Gate to source voltage 260 controls the conduction of MOSFET 220.

From just after time t10 until time t40, lights off power supply 17 operates in the discharge mode. In particular, gate to source voltage 260 is substantially negative causing MOSFET 220 not to conduct. Preregulator voltage 26 exceeds drop out voltage of voltage regulator 27 so that control circuit voltage 31 is provided by the power stored in electrolytic capacitor 25 during a previous cycle. Since preregulator voltage 26 exceeds drop out voltage, MOSFET control signal 39 is high which keeps MOSFET 220 off or non-conducting. During this time interval virtually no current is conducted to the load, no leakage current.

It is important to note that drop out voltage must be slightly greater than the minimum drop out voltage of voltage regulator 27 because preregulator voltage 26 may continue to decay for part of a portion of a cycle. In particular, as shown, preregulator voltage 26 decays below drop out voltage $V_{DROPOUT}$ at time t20. When voltage 26 decays below voltage 210, power supply control comparator output 360 goes low. MOSFET control signal 39 remains high since at time t20 the AC hot lead voltage exceeds the limit set by comparator 325 causing voltage 350 to be high. Recall that if either voltage 350 or 360 is high, voltage 39 will be high, therefore both need to be low in order to replenish the storage device 25. At time t30, the AC hot lead 15 voltage goes below the limit set by the voltage limiting comparator 325, causing voltage 350 to go low. Since now both voltage 350 and 360 are low, MOSFET control voltage 39 goes low, causing MOSFET 220 to conduct. Note however that the preregulator voltage continues to discharge since AC hot lead voltage 15 is still in the negative half cycle. At time t40, AC hot lead voltage 15 enters the next positive half cycle, and electrolytic capacitor 25 begins to replenish. At time t50, preregulator voltage is replenished, causing comparator 32 to go high and start discharge mode. At time t60, AC hot lead voltage exceeds the threshold voltage limit set by voltage limiting comparator 325, causing its output to go high.

The load condition is the amount of power required by relay control circuit 18. It is important to note that power supply 17 is load driven in that MOSFET 220 is caused to operate more often under high load conditions for voltage regulator 27 than it operates under lower load conditions.

In accordance with the present invention, MOSFET 220 is selectively operated in response to the load on voltage regulator 27 which results in a substantial saving of otherwise wasted power in a conventional system. For example, a conventional line powered supply produces wasted power at voltage and load conditions for which it is designed, the amount of power wasted is a function of the range of voltages and loads for which the circuit was designed. With the present invention, the amount of power wasted is minimal and not dependent on the range of voltages or loads for which the circuit is designed, but rather is directly dependent on the power actually used by the circuit.

Having now described the invention in accordance with the requirements of the patent statutes, those skilled in this art will understand how to make changes and modifications in the present invention to meet their specific requirements or conditions. For example, the lights on power supply 18 could be connected directly to a constant source of AC voltage, in which case control circuit 29,29' could be readily modified to cause power supply 18 to function as a regulated DC supply circuit for various applications not requiring a power off control voltage. Such changes and modifications may be made without departing from the scope and spirit of the invention as set forth in the following claims.

I claim:

1. A line powered load control device for series connection with an external load in an AC circuit, said control device comprising:
    a DC supply circuit for providing low voltage DC from a higher peak AC voltage, said DC supply circuit including
        storage means for storing the low voltage DC,
        a first switchable electronic switching device for selectively applying the AC voltage to the storage means, and
        control means responsive to the storage means for inhibiting the switchable electronic switching device from applying power from the AC voltage to the storage means whenever the stored DC voltage is above a predetermined drop out voltage level; and
    a switchable load means powered by the DC supply circuit for selectively applying the AC voltage to the external load,
    wherein the amount of AC power input to the DC supply circuit is variable and is dependent only on the power required by the control means and by the switchable load means, whereby only a minimal amount of the AC power is wasted over a relatively wide range of loads.

2. The line powered load control device of claim 1, wherein the switching frequency of the first switchable electronic switching device is substantially less than the line frequency of the AC voltage, whereby any associated interference is reduced.

3. The line powered load control device of claim 1, wherein at least when the external load is in an on state, power is applied from the AC voltage to the storage means only during selected portions of selected half cycles of the AC voltage, and the AC voltage is applied to the external load during the entirety of the unselected half cycles and during only the unselected portions of the selected half cycles.

4. The line powered load control device invention of claim 3, wherein the storage means further comprises
    a capacitor for storing a pre-regulated DC voltage;
    a regulator operable when the pre-regulated DC voltage exceeds the drop out voltage for rectifying the pre-regulated voltage to provide said low voltage DC; and
the control means further comprises
    comparator means for effectively disconnecting the external load from the AC voltage when the preregulated voltage decays below the drop out voltage.

5. The line powered load control device of claim 3, wherein the control means is also responsive to the AC voltage, and power is applied to the storage means only during half cycles of a predetermined polarity.

6. The line powered load control device of claim 5, further comprising:
    a bypass diode in parallel with the first electronic switching device to complete the AC load circuit during at least one half of every cycle of AC voltage in the on condition; and
    a first rectifying diode for charging the power storage system during the other half of the cycle of AC voltage;
    second and third rectifying diodes forming a diode bridge rectifier with the first rectifying diode and the bypass diode; and
    a surge control circuit connected to the diode bridge rectifier.

7. The line powered load control device of claim 5, wherein the charging control circuit further comprises:
    a rectifier responsive to the interrupted AC across the first electronic switching device for charging the power storage system.

8. The line powered load control device of claim 7, wherein:
    the first electronic switching device is a MOSFET transistor having drain, source and gate connections; and
    an output from the control means is applied to the gate connection of the MOSFET transistor and
    the charging mode rectifier is applied across the drain and source connections of the MOSFET transistor.

9. A method of operating the line powered load control device of claim 7, comprising the steps of:
    storing power in the capacitor to power the load control circuit;
    interrupting a series connection between the load and the control device when a voltage across the capacitor has decayed to said drop out voltage; and
    rectifying the voltage across the interrupted series connection to recharge the capacitor.

10. The method of claim 9, wherein the step of interrupting the series connection further comprises the step of:
    operating the first switchable electronic switching device to momentarily stop conducting during said first portion while the voltage across the capacitor is at or below the dropout voltage.

11. The method of claim 9, wherein the first switchable electronic switching device resumes conducting during said first portion when the capacitor has been charged to at least that dropout voltage.

12. The line powered load control device of claim 3, wherein
    said first switchable electronic switching device is connected in series with the switchable load means and functions only during said on state,
    said line powered load control device further comprises a second switchable electronic switching device that also is responsive to the control means but that is connected in parallel with the switchable load means and functions only during an off state of the external load, and
    in both said on state and said off state, said power is applied to the storage means only during selected portions of selected half cycles of the AC voltage.

13. The line powered load control device of claim 1, wherein
    the switchable electronic switching device is connected in parallel with the switchable load means at least when the external load is in an off state, and
    the AC power is input to the storage means only during selected portions of selected half cycles of the AC voltage.

14. The line powered load control device of claim 13, further comprising voltage limiting means operative in the off state of the external load for inhibiting the input of AC power to the storage means until the beginning of a half cycle, whereby transients and electromagnetic interference are minimized.

15. A line powered load control device for series connection in an AC circuit across an AC voltage, comprising:

a primary switching device;

a load control circuit for selectively operating the primary switching device in an on condition to complete an AC load circuit and in an off condition to interrupt the AC load circuit;

a power storage system for storing a DC control circuit voltage and supplying the DC voltage to the load control circuit, said DC voltage being substantially lower than a peak value of said AC voltage;

a first power supply, connected in series with the primary switching device, for charging the power storage system from the AC voltage during the on condition; and a second power supply, connected in parallel with the primary switching device, for charging the power storage system from the AC voltage during the off condition;

wherein at least one of the power supplies is responsive to the power storage system and includes a switchable electronic switching device for selectively applying the AC voltage to the power storage system, and control means for inhibiting the switchable electronic switching device from applying any power from the AC voltage to the power storage system whenever the stored DC voltage is above a predetermined drop out voltage level.

* * * * *